Dec. 15, 1970  H. J. SCHWERDHOFER  3,546,971
AUTOMATICALLY SHIFTING MULTIPLE-SPEED HUB
Filed June 5, 1969  4 Sheets-Sheet 1

INVENTOR
Hans Joachim Schwerdhöfer
By: Law and Berman
AGENTS

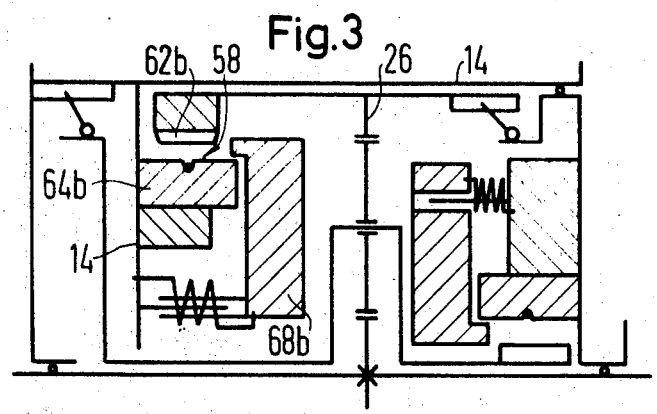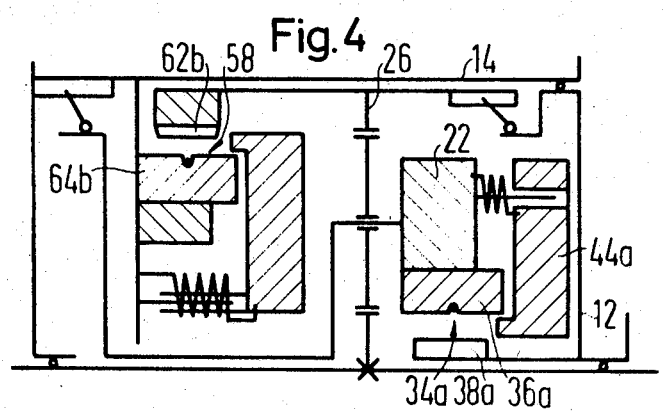

Dec. 15, 1970   H. J. SCHWERDHOFER   3,546,971
AUTOMATICALLY SHIFTING MULTIPLE-SPEED HUB
Filed June 5, 1969   4 Sheets-Sheet 4

United States Patent Office 3,546,971
Patented Dec. 15, 1970

3,546,971
AUTOMATICALLY SHIFTING MULTIPLE-SPEED HUB
Hans Joachim Schwerdhofer, Schweinfurt am Main, Germany, assignor to Fichtel & Sachs AG, Schweinfurt am Main, Germany
Filed June 5, 1969, Ser. No. 830,779
Claims priority, application Germany, June 15, 1968, 1,750,897
Int. Cl. F16h 3/74
U.S. Cl. 74—752          10 Claims

ABSTRACT OF THE DISCLOSURE

A bicycle hub having $n$ (at least three) transmission ratios and automatically shifting between the ratios is equipped with $n-2$ planetary gearing sets connected with the hub shell and the driver of the hub by overrunning clutches partly controlled by $n-1$ centrifugal governors. Examples of 3-speed and 4-speed hubs are given.

This invention relates to automatically shifting multiple-speed hubs for bicycles and like vehicles, and particularly to centrifugally controlled hubs having three or more speeds or transmission ratios.

Known multiple-speed hubs employ planetary gearing and overrunning clutches interposed between the several elements of one or more sets of planetary gearing and the hub shell. The desired speed ratio is set by engaging and disengaging the clutches. Since a set of planetary gearing includes only two elements which coaxially rotate at different speeds, usually the planet carrier and the ring gear, the known three-speed hubs of this type, as typically shown in French Patent No. 1,348,324, require two sets of planetary gearing in driving series connection, that is, only one set less than the number of available speeds, and a set of planetary gearing must be added for each desired additional speed.

The planetary gearing occupies much space in the hub shell and is usually the most expensive part of the hub. The primary object of the invention thus is the provision of an automatically shifting multiple-speed hub in which at least three speeds are achieved by means of a number of sets of planetary gearing which is smaller than in known hubs having an equal number of available speeds or transmission ratios.

With this object and others in view, as will hereinafter become apparent, the invention provides a multiple-speed hub with a transmission arrangement mounted in the hub shell for transmitting torque from a driver member to the shell at each of at least three speeds or transmission ratios in which the number of sets of planetary gearing is smaller by two than the number of available speeds. When the number of sets is greater than one, they are drivingly connected in series. A number of centrifugal governors smaller by one than the number of available speeds is provided. Each governor responds to a different rotary speed of the hub shell for moving between an operative and inoperative position. Clutches are interposed between respective pairs of members constituted by the elements of the gearing set or sets, the hub shell, and also including the driver member. Two clutches are associated with each governor in such a manner that they alternatively transmit torque between the members of the associated pairs of members when the associated governor is in the operative and in the inoperative position respectively.

Other features, additional objects, and many of the attendant advantages of this invention will readily become apparent as the same becomes better understood by reference to the following detailed description of preferred embodiments when considered in connection with the appended drawing in which:

FIGS. 1 to 4 shows three-speed hubs of the invention in conventional symbols, one half of each hub being represented in axial section;

Figure 1:
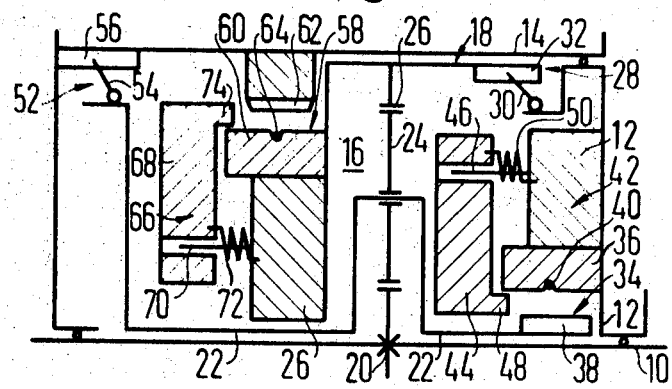

Referring now to the drawing in detail, and initially to FIG. 1, there is seen a normally stationary shaft 10 for the rear wheel of a bicycle. A driver 12 is rotatably mounted on the shaft. The two axial ends of a hub shell 14 are rotatably supported on the driver 12 and on the shaft 10 respectively, and the shell encloses the mechanism 16 which transmits rotary movement from the driver 12 to the shell 14 at any one of three different transmission ratios, the transmission ratio being selected automatically in response to the rotary speed of the hub shell on the shaft 10.

The mechanism 16 includes only one planetary gear set 18 whose sun gear 20 is integral with or fixedly mounted on the shaft 10 as is conventional. A planet carrier 22 coaxially rotatable on the shaft 10 carries three planet gears 24 of which only one is seen in FIG. 1. The planet gears simultaneously mesh with the sun gear 20 and with internal teeth on a ring gear 26.

A first clutch 28 is interposed between the driver 12 and the ring gear 26. It mainly consists of a pawl 30 secured on the driver 12 and a ratchet rim 32 on the ring gear 26. A pawl spring, not shown, biases the pawl 30 toward driving engagement with the ratchet rim 32.

A second clutch 34 may connect the driver 12 with the planet carrier 22. It includes a pawl 36 on the driver 12 and a ratchet rim 38 on the planet carrier 22. An open ring 40 of spring steel wire biases the pawl 36 toward engagement with the rim 38, and is representative of other pawl springs in the hub, not specifically shown. A first centrifugal governor 42 controls the clutch 34. The governor includes a centrifugal weight 44 hingedly mounted on the driver 12 by means of a pivot pin 46. A boss 48 on the weight 44 engages the pawl 36. A return spring 50 connects the weight 44 and the driver 12 in such a manner as to oppose movement of the weight away from the hub axis under the influence of centrifugal forces, and to bias the weight toward the illustrated position in which the boss 48 holds the pawl 36 out of engagement with the ratchet rim 38.

A third clutch 52 is interposed between the planet carrier 22 and the hub shell 14. It includes a pawl 54 mounted on the carrier 22, a ratchet rim 56 on the hub shell 14, and a nonillustrated pawl spring which biases the pawl 54 toward the rim 56.

A fourth clutch 58 is provided for connecting the ring gear 26 with the hub shell 14. It consists essentially of a pawl 60 mounted on the ring gear 26, a ratchet rim 62 on the hub shell 14, and a pawl spring 64 which cooperate as described above. A second centrifugal governor 66 controls the fourth clutch 58 and includes a centrifugal weight 68 identical with the weight 44, pivotally mounted on the ring gear 26 by means of a pin 70, and equipped with a return spring 72 which biases the weight 68 toward the illustrated position in which a boss 74 on the weight 68 engages the pawl 60 to keep the clutch 58 disengaged.

The three-speed hub, as far as illustrated in FIG. 1, operates as follows:

At low rotary speeds of the driver 12, the driver is coupled to the ring gear 26 by the first clutch 28. The ring gear drives the planet carrier 22 at a reduced speed, and rotation at the reduced speed is transmitted from the planet carrier 22 to the hub shell 14 by the third clutch 52. The hub shell 14 and the nonillustrated other elements of the rear wheel rotate more slowly than the driver 12. The transmission ratio of the hub is at its lowest value.

As the rotary speed of the driver 12 increases, the centrifugal forces acting on the weight 44 can overcome the restraint of the return spring 50, and the first centrifugal governor 42, in cooperation with the pawl spring 40, engages the second clutch 34, whereby the planet carrier 22 is directly coupled to the driver 12. The ratchet rim 32 of the first clutch 28 overruns the pawl 30. The hub shell 14 is driven from the planet carrier 22 by the third clutch 52. The hub shell rotates at the same speed as the driver 12. The transmission ratio of the hub is at an intermediate value.

The return springs 50, 72 are selected in such a manner that the second centrifugal governor 66 does not permit engagement of the fourth clutch 58 until the hub shell 14 rotates at a speed higher than that at which the first governor 42 engages the second clutch 34. At that higher speed, the second governor permits engagement of the pawl 60 with the ratchet rim 62. Torque is transmitted from the driver 12 by the engaged second clutch 34 to the planet carrier 22, from the latter to the ring gear 26 which is rotated at a speed higher than the common speed of the driver 12 and of the planet carrier 22, and from the ring gear to the hub shell 14 by the engaged fourth clutch 58. The hub shell rotates faster than the driver, and the transmission ratio of the hub is at its highest value.

Figure 2:
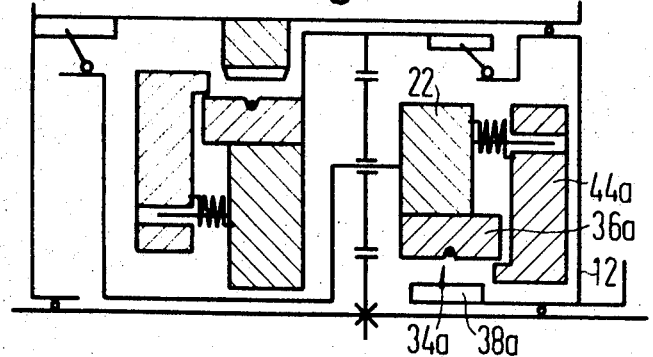

The modified three-speed hub shown in FIG. 2 differs from the apparatus shown in FIG. 1 by a modified second clutch 34a. It includes a pawl 36a on the planet carrier 22 and a ratchet rim 38a provided on the driver 12a. The associated centrifugal governor correspondingly has a centrifugal weight 44a hingedly secured to the planet carrier. The operation of the apparatus is not affected by the interchange of cooperating clutch and governor elements between the driver and the planet carrier.

In the modified hub illustrated in FIG. 3, the fourth clutch 58 has a pawl 64b mounted on the hub shell 14 and a cooperating ratchet rim 62b arranged on the ring gear 26. The centrifugal weight 68b rotates with the pawl 64b and is mounted on the hub shell 14.

The embodiment of the invention illustrated in FIG. 4 combines the modified second and fourth clutches described above with reference to FIGS. 2 and 3 with the otherwise substantially unchanged structure of the hub illustrated in FIG. 1. The hubs of FIGS. 3 and 4 operate as described with reference to FIG. 1 with such modifications in the choice of the return springs as will be needed to provide speed changes at the desired wheel speeds.

Figure 5:
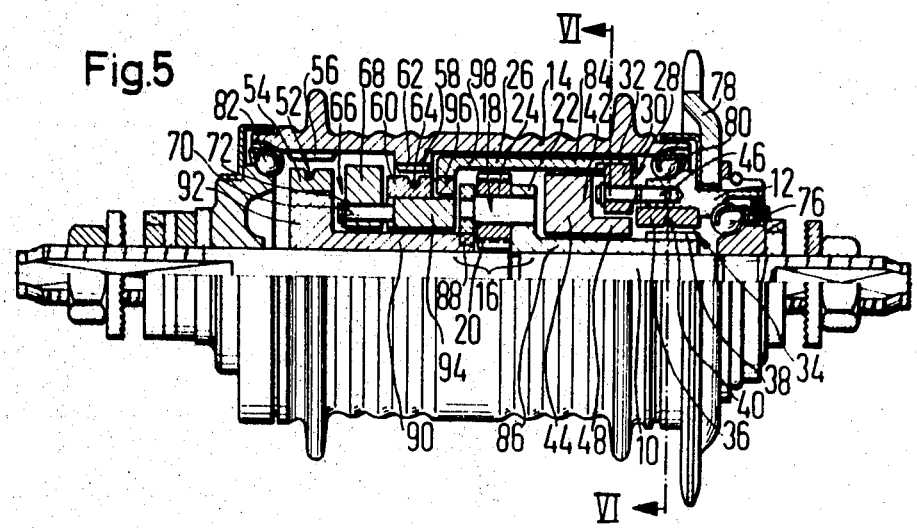
FIG. 5 is an elevational view, partly in axial section, of the hub of FIG. 1.
Figure 6:
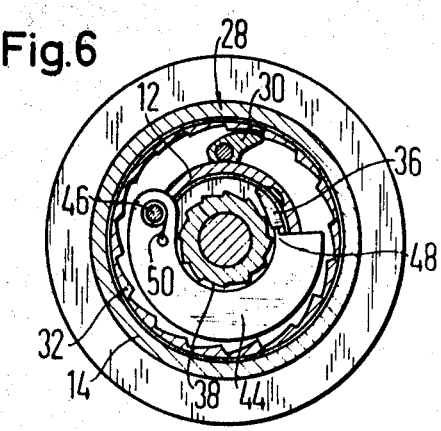
FIG. 6 illustrates the hub of FIG. 5 in radial section on the line VI—VI.

The hub of FIG. 1 is shown more realistically in the views of FIGS. 5 and 6 which also include elements omitted from the showing of FIG. 1 and the corresponding views of FIGS. 2, 3, 4 and 7 for the sake of clarity.

The driver 12 rotates on a ball bearing 76 mounted on the shaft 10 and is fixedly fastened to a drive sprocket 78 extending outside the shell 14, as is conventional. Ball bearings 80, 82 on the driver 12 and on the stationary shaft 10 support the two axial ends of the hub shell 14. The pawl 30 of the first clutch 28 is attached to a radial face of the driver 12, and engages an internal rim of ratchet teeth 32 on a tubular projection 84 of the ring gear 26.

The planet carrier 22 has a long tubular hub 86 rotatably supported on the shaft 10 and axially partly coextensive with the carrier 12. Interengaged projections 88 fixedly connect the planet carrier 22 in the assembled hub with one end of a sleeve 90. The other end of the sleeve, remote from the centrally arranged sun gear 20 in a direction away from the driver 12 has a radial flange 92 on which the pawl 54 of the third clutch 52 is mounted.

A ring 94 rotatably mounted on the sleeve 90 is fixedly connected by interengaged teeth 96 with a tubular extension 98 of the ring gear 26, the teeth 96 being remote from the driver 12. The ring 94 carries the pawl 60 of the fourth clutch 58 and the weight 68 of the associated second centrifugal governor 66.

The manner in which the centrifugal weight 44 is mounted on the driver 12 by means of the pivot pin 46, and the engagement of the boss 48 with the pawl 36 of the second clutch 34 under the biasing force of the spring 50 are best seen in FIG. 6 which also shows the cooperating elements of the first clutch 28. The operation of the hub shown in FIG. 5 has been described with reference to FIG. 1.

Figure 7:
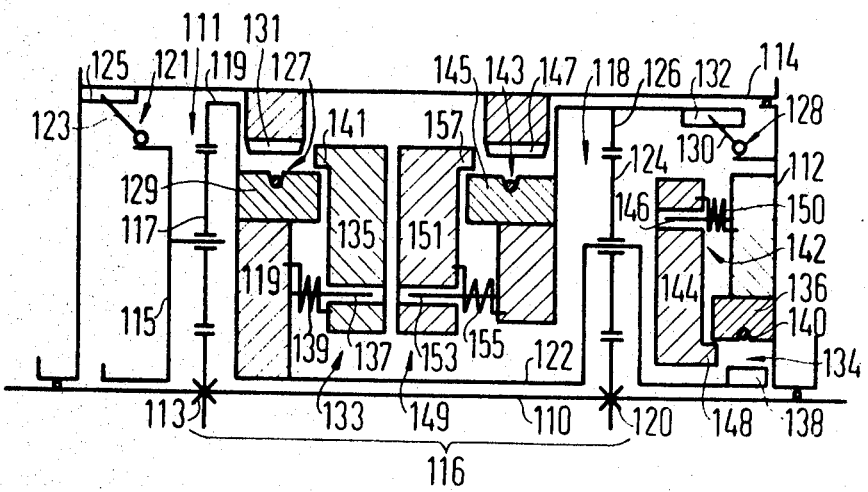
FIG. 7 shows a four-speed hub of the invention in the manner of FIGS. 1 to 4.

The four-speed hub illustrated in FIG. 7 has many elements analogous to those of the hub shown in FIG. 1, and corresponding reference numerals, augmented by 100, have been used for designating the related parts of the hub of FIG. 7.

The hub has a stationary shaft 110 on which a driver 112 is mounted for coaxial rotation. The two axial ends of a hub shell 114 are rotatably mounted on the shaft 110 and the driver 112 respectively. The hub shell encloses a four-speed transmission mechanism 116. The mechanism includes a first set 118 of planetary gearing which consists of a sun gear 120 on the shaft 110, a planet carrier 122 coaxially rotatable about the shaft 110 and carrying planet gears 124 which mesh with the sun gear 120 and a ring gear 126.

A first overrunning clutch 128 capable of drivingly connecting the driver 112 with the ring gear 126 includes a pawl 130 on the driver and a ratchet rim 132 on the ring gear. A second clutch 134 including a pawl 136 on the driver 112 and a ratchet rim 138 on the planet carrier 122 is biased toward engagement by a pawl spring 140, and normally disengaged by a first centrifugal governor 142 including a centrifugal weight 144 mounted on the driver 112 by means of a pivot pin 146, and biased toward the clutch disengaging position by a return spring 150, a boss 148 on the weight 144 normally engaging the pawl 136. The structure described so far is closely analogous to that shown in FIG. 1.

The mechanism 116 includes a second set 111 of planetary gearing consisting of a sun gear 113 fixedly mounted on the shaft 110, a planet carrier 115 rotatable on the shaft and carrying planet gears 117 which mesh with the sun gear 113 and with a ring gear 119. The latter is fixedly coupled with the planet carrier 122 of the first planetary gearing 118.

A third clutch 121 interposed between the planet carrier 115 and the hub shell 114 consists of a pawl 123 on the carrier, a ratchet rim 125 on the hub and a nonillustrated pawl spring. A fourth clutch 127 for connecting the ring gear 119 and the hub shell 114 includes a pawl 129 on the ring gear 119 and a ratchet rim 131 on the hub shell. The clutch 127 is controlled by a second centrifugal governor 133 including a weight 135 pivotally mounted on the ring gear 119 by means of a pin 137 and biased by a return spring 139 toward the illustrated position in which a boss 141 on the weight 135 disengages the pawl 129 from the ratchet rim 131.

A fifth, overrunning clutch 143 is operatively interposed between the ring gear 126 of the first planetary gear set 118 and the hub shell 114 and includes a pawl 145 on the ring gear 126 and a ratchet rim 147 on the hub shell 114. It is shifted between the engaged and disengaged positions by a third centrifugal governor 149 including a centrifugal weight 151 pivoted on a pin 153 which projects from the ring gear 126 and a return spring 155 which normally holds a boss 157 on the weight 151 in engagement with the pawl 145 to retract the pawl into the illustrated, inoperative position.

The illustrated four-speed hub operates as follows:

At very low rotary speeds of the wheel centered in the hub and not otherwise shown, torque is transmitted from the driver 112 to the hub shell 114 by the first clutch 128, the ring gear 126 of the first planetary gearing 118, the planet carrier 122, the ring gear 119 of the second planetary gearing 111, the planet carrier 115, and the third clutch 121. The speed is reduced in each of the planetary gear sets 118, 111, and the hub shell 114 is rotated at the first or lowest transmission ratio of which the hub is capable.

At increasing speed, the first governor 142 permits engagement of the second clutch 134, and torque is transmitted from the driver 112 to the planet carrier 122, the ring gear 119, the planet gears 117, the planet carrier 115, the third clutch 121, and the hub shell which is driven at a second or lower intermediate speed lower than that of the driver 112. The ratchet rim 132 of the first clutch 128 overtravels the pawls 130.

At yet higher speed, the fourth clutch 127 is permitted to engage by the second centrifugal governor 133. Torque is transmitted from the driver 112, in sequence, to the second clutch 134, the planet carrier 122, the fourth clutch 127, and the hub shell 114. The hub shell is coupled to the driver for point rotation at the same speed at the third transmission ratio of the hub.

When the speed of the wheel increases further, the third centrifugal governor 149 releases the pawl 145 of the fifth clutch 143, and the hub shell 114 is rotated by the driver 112 and a motion transmitting train which includes the second clutch 134, the planet carrier 122, the planet gears 124, the ring gear 126, and the fifth clutch 143. The hub shell 114 rotates at the speed of the ring gear 126 which is higher than that of the driver 112 by the fourth transmission ratio of that hub.

Obviously, centrifugally controlled automatic transmissions having more than four speeds can be designed in the manner of the invention as described with reference to the three- and four-speed hubs. The number of speeds provided is limited solely by the mechanical strength of the materials of construction employed which controls the dimensions of the several hub elements, and by the limitations to the size of the hub shell in which the transmission mechanism is to be housed.

The multiple-speed hubs of the invention provide any desired number of transmission ratios or speeds $n$ with $n-2$ sets of planetary gears, and the reduction in the number of planetary ear sets to two less than the number of available transmission ratios is provided by at least two clutches which connect elements of the motion transmitting trains, but are not attached to the hub shell itself.

In the illustrated preferred embodiments of the invention, each centrifugal governor is associated with two clutches of which one is a simple overrunning clutch transmitting torque in the operative condition of the governor, and the other clutch is engaged when the governor moves from the operative to the inoperative condition under adequate centrifugal forces, the overrunning clutch becoming ineffective when the controlled other clutch is thereby engaged.

FIGS. 2 to 4 illustrate variations and permutations of individual elements in the hub of FIGS. 1, 5, and 6, but other, and more far-reaching modifications and variations will readily suggest themselves to those skilled in the art on the basis of the foregoing teachings. It should therefore be understood that the invention can be practiced otherwise than as specifically disclosed.

What is claimed is:

1. A multiple-speed hub for a bicycle and like vehicle, comprising, in combination:
   (a) a normally stationary shaft (10) having an axis;
   (b) a driver member (12) rotatable on said shaft about said axis;
   (c) a hub shell (14) supported on said shaft for rotation about said axis relative to said shaft and said driver member; and
   (d) multiple-speed transmission means (16) mounted in said shell for transmitting torque for said driver member to said shell at each of at least three speeds or transmission ratios, said transmission means including:
   (1) a number of sets of planetary gearing (18),
      (i) the number of said sets being smaller by two than the number of said speeds,
      (ii) said sets being drivingly connected in series when the number of sets is greater than one,
      (iii) each set including a plurality of elements (20, 22, 24, 26) operatively connected for movement relative to each other,
   (2) a number of centrifugal governers (42, 66),
      (i) each governor being responsive to a different rotary speed of said shell for moving between an operative and an inoperative position,
      (ii) the number of said governors being smaller by one than the number of said speeds, and
   (3) a plurality of clutch means (28, 34, 52, 58) interposed between respective pairs of members constituted by said driver member, said elements of said number of gearing sets, and said shell,
      (i) two of said clutch means being associated with each of said governors for alternatively transmitting torque between the members of the associated pairs of members when the associated governor is in the inoperative position respectively.

2. A hub as set forth in claim 1, wherein the two clutch means (28, 34) associated with one of said governors (42) are interposed between said driver member and respective elements (22, 26) of said number of sets of planetary gearing.

3. A hub as set forth in claim 1, wherein each of said governors includes means (48, 74) engageable with one of the associated clutch means for operating said one associated clutch means when said governor moves between said positions thereof, the other associated clutch means including an overrurnning clutch.

4. A hub as set forth in claim 1, wherein said elements of one of said sets include a sun gear (2) fixed on said shaft, a planet carrier (22) rotatable about said axis, a ring gear (26) coaxial with said sun gear and said planet carrier, and a planet gear (24) rotatable on said planet carrier in simultaneous meshing engagement with said sun gear and said ring gear, the clutch means associated with one of said governors including a first clutch means (28) operatively interposed between said drived members and said ring gear, and a second clutch means (34) interposed between said driver member and said carrier.

5. A hub as set forth in claim 4, wherein the number of said speeds is three, the number of said sets is one, and the number of said governors is two, the other one of said governors (66) being associated with a third one of said clutch means (52) operatively interposed between said carrier and said shell and with a fourth clutch means (58) operatively interposed between said ring gear and said shell.

6. A hub as set forth in claim 5, wherein said shaft has two axial end portions, and a central portion intermediate said end portion, said sun gear being fixed on said central portion, and said driver member being mounted on one of said end portions remotely from said sun gear, a portion (86) of said planet carrier axially extending from said sun gear toward said driver member, said portion of said carrier and said driver member being partly axially coextensive, a portion (84) of said ring gear axially extending from said sun gear toward said driver member and being closely adjacent the driver member, said first and second clutch means each including a pawl member and a ratchet member, the members of said first clutch means being respectively mounted on said portion (84) of the ring gear and on said driver member, and the members of said second clutch means being respectively mounted on the axially coextensive parts of said carrier and of said driver member.

7. A hub as set forth in claim 6, wherein another portion (90, 92) of said carrier extends from said sun gear toward the other end portion of said shaft, the hub further including an annular member (94) coaxially rotatable on said other portion of the carrier and connected to said ring gear for rotation therewith, said third clutch means being operatively interposed between said other portion of the carrier and said shell, and said fourth clutch means being operatively interposed between said annular member and said shell, said other governor including a weight (68) radially interposed between said other portion of said carrier and said shell, and axially interposed between said third clutch means and said annular member for movement toward and away from said axis, and engaging means (74) on said weight engageable with said fourth clutch means for operating the same.

8. A hub as set forth in claim 4, wherein the number of said speeds is four, the number of said sets is two, and the number of said governors is three, the elements of the other one of said sets (111) including a sun gear (113) fixed on said shaft, a planet carrier (115) and a ring gear (119) rotatable about said axis, a planet gear (117) rotatable on said carrier of the other set in meshing engagement with the sun gear and ring gear of the other set, said ring gear (119) of said other set being secured to the planet carrier of said one set for joint rotation about said axis, a third clutch means (121) being operatively interposed between said planet carrier (115) of said other set (111), a fourth clutch means (127) being interposed between the ring gear (119) of said other set (111) and said hub shell (114), the second one of said governors (133) being associated with said third clutch means and with said fourth clutch means, a fifth clutch means (143) being operatively interposed between the ring gear (116) of said one set (118) and said hub shell, said fourth and fifth clutch means being associated with the third governor (149).

9. A hub as set forth in claim 1, wherein one of the clutch means associated with each governor has a pawl portion and a ratchet portion, engageable by the pawl portion, the pawl portion of said one clutch means being movably mounted on one member of the associated pair of members, and the ratchet portion being mounted on the other member of said pair, said governor including a weight mounted on said one member for movement toward and away from said axis between said operative and inoperative positions of said governor, and means on said weight engaging said pawl portion during movement of the weight toward said axis for disengaging the pawl portion from said ratchet portion.

10. A hub as set forth in claim 9, wherein said weight is pivotally mounted on said one member for movement toward and away from said axis, the governor further including yieldably resilient means biasing said weight toward said axis.

References Cited
UNITED STATES PATENTS

| | | | |
|---|---|---|---|
| 3,143,005 | 8/1964 | Schwerdhofer | 74—752 |
| 3,432,013 | 3/1969 | Matsamoto | 74—750X |
| 3,438,283 | 4/1969 | Schwerdhofer | 74—752X |
| 3,492,893 | 2/1970 | Shimano et al. | 74—752 |
| 3,494,227 | 2/1970 | Shimano et al. | 74—752 |

ARTHUR T. McKEON, Primary Examiner